Figure 1:
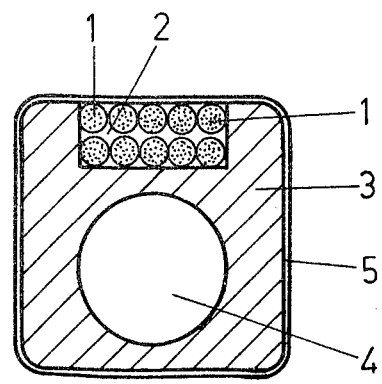

United States Patent [19]

Horvath et al.

[11] 4,254,299

[45] Mar. 3, 1981

[54] ELECTRICAL SUPERCONDUCTOR

[75] Inventors: Imre Horvath, Rümlang; Kurt Kwasnitza, Glattbrugg; Gundolf Meyer, Birmenstorf, all of Switzerland

[73] Assignee: BBC Brown, Boveri & Company, Limited, Baden, Switzerland

[21] Appl. No.: 812,409

[22] Filed: Jul. 1, 1977

[30] Foreign Application Priority Data

Aug. 31, 1976 [CH] Switzerland ............... 11016/76

[51] Int. Cl.$^3$ ............................................ H01B 12/00
[52] U.S. Cl. ............................. 174/15 S; 29/599; 174/128 S
[58] Field of Search ............... 174/15 S, 128 S, 126 S, 174/15 C; 29/599

[56] References Cited

U.S. PATENT DOCUMENTS

| | | | |
|---|---|---|---|
| 3,277,564 | 10/1966 | Webber et al. | 174/128 S |
| 3,527,873 | 9/1970 | Brechna et al. | 174/15 S |
| 3,639,672 | 2/1972 | Kafka | 174/15 S |
| 3,643,001 | 2/1972 | Schaetti | 174/15 S |
| 3,646,249 | 2/1972 | Moisson-Franckhauser | 174/15 S |
| 3,657,466 | 4/1972 | Woolcock et al. | 174/15 S |
| 3,662,093 | 5/1972 | Wilson et al. | 174/128 S |
| 3,699,647 | 10/1972 | Bidault et al. | 174/128 S |
| 4,079,187 | 3/1978 | Fillunger et al. | 174/15 S |

OTHER PUBLICATIONS

Dustmann, C. H., *Studies on Design and Tests of Superconductors for Tokomaks,* Institut fur Experimentelle Kernphysik, Kernforschungszentrum Karlsruhe, Congress at Garmisch-Partenkirchen, Jun. 1976.

*Primary Examiner*—B. A. Reynolds
*Attorney, Agent, or Firm*—Burns, Doane, Swecker & Mathis

[57] ABSTRACT

A superconductor structure is disclosed in which a plurality of superconductive assemblies are provided with at least one cooling arrangement. The superconductive assemblies consist of superconductor components and a stabilizing conductor, with at least a portion of the stabilizing conductors in the structure being provided with cooling passages. A cooling arrangement is enclosed between adjacent superconductive assemblies. The assemblies are preferably insulated from each other to prevent eddy current flow and may be joined by resistors or diodes connected across the ends of the superconductor components.

19 Claims, 5 Drawing Figures

ELECTRICAL SUPERCONDUCTOR

The invention concerns a superconductor composed of a number of component conductors and provided with at least one cooling arrangement and at least one stabilising conductor.

Superconductors composed of component conductors and having cooling arrangements and stabilising conductors are already known. A superconductor is described and illustrated in Swiss Patent CH-PS 508 292. It is in the form of a hollow conductor of superconducting material and of metal which conducts normally at the operating temperature of the superconducting material, such that the superconducting material is located on the outer sides of a tube of normally conducting metal of virtually square cross-section, on at least one outer side of the tube, and mechanically joined to the tube, there being a strip-shaped conductor consisting of metal that conducts electrically normally and of wires of superconducting material, these wires being held in the normally conducting metal and twisted about the longitudinal axis of the strip-shaped conductor. The strip-shaped conductor can constitute a number of component conductors, laid side by side, of electrically normally conducting metal in which wires of superconducting material are contained. This conductor will exhibit high losses in alternating fields.

Another possible construction is described and illustrated in "Studies on Design and Tests of Superconductors for Tokomaks", Institut für Experimentelle Kernphysik, Kernforschungszentrum Karlsruhe, congress at Garmisch-Partenkirchen, June 1976. A number of superconductor elements are arranged on either side of a strip-shaped support. The support is located within a flat rectangular duct with steel spacers. The height of the steel spacers is greater than that of the superconductor elements so that the latter do not touch the walls of the duct. The disadvantage of this arrangement is that it is costly to make and in the presence of strong magnetic forces can provide little mechanical resistance.

The object of the invention in particular is to create a superconductor of the kind stated above which does not have the disadvantages of known solutions, can be made economically, permits good cooling and assures smaller losses.

With a superconductor composed of a plurality of superconductor asemblies comprised of a number of component conductors and having at least one cooling arrangement and at least one stabilising conductor, this object is achieved in that the superconductor is divided into a number of assemblies of component conductors or groups of component conductors and that at least some of these component conductors or groups of component conductors are provided with their own cooling arrangement or adjoin the latter.

The advantage of the invention is to be seen particularly in the fact that the superconductor incorporates an effective cooling system, there being no upper limit to the current-carrying capacity of the superconductor because the current capacity can be increased on the modular principle by increasing the number of component conductors or groups of component conductors having their own cooling arrangement.

In an alternative form stabilising conductors are disposed adjacent at least a few assemblies of component conductors or groups of component conductors. In this way, each assembly of component conductor or group of component conductors is largely stabilised, and the stabilising material is located adjacent to the superconducting filaments. It is of benefit if the cooling arrangements are in the form of channels in the stabilishing conductors. The heat generated in the stabilising conductor can then be rapidly removed. In a further variant the cooling arrangements are in the form of cooling channels which are surrounded by assemblies component conductors or groups of component conductors. They assist cooling.

It is also advantageous if the assemblies of component conductors or groups of component conductors are insulated from each other. In this case, eddy currents are restricted to the component conductors or groups of component conductors.

In another alternative, intermediate layers of high resistance reltive to the conductivity of the matrix material are located between the assemblies of component conductors and/or groups of component conductors, these layers being preferably of solder or a high-resistance foil. They permit good heat removal to the nearest cooling channels, but weaken the eddy currents.

Another alternative provides for the ends of the component conductors or of the groups of component conductors to be joined or insulated through a high electrical resistance. Twisting the superconductor is then superfluous.

It is of advantage if the ends of the component conductors or of the groups of component conductors are joined by way of diodes. Here, too, twisting the superconductor is unnecessary and the entire conductor can be operated as a single current source.

According to another variant the component conductors and/or groups of component conductors are stranded into a cable.

The advantage of this variant is that the assembly is solid and losses are reduced.

In another variant the superconductor is rotated through 180° at one place at least.

This has the effect of reducing the voltages caused at the ends of the conductor by eddy currents.

Figure 2:
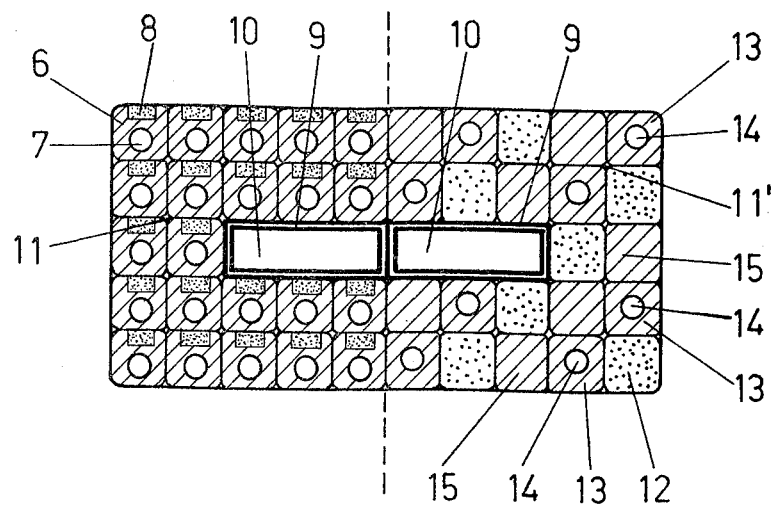
Figure 3:
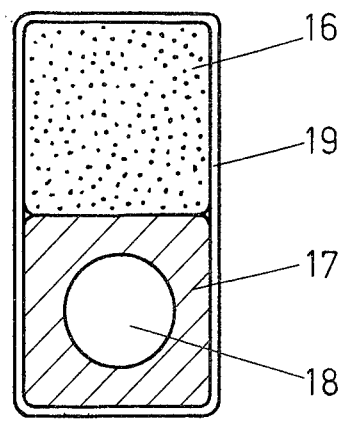
Figure 4:
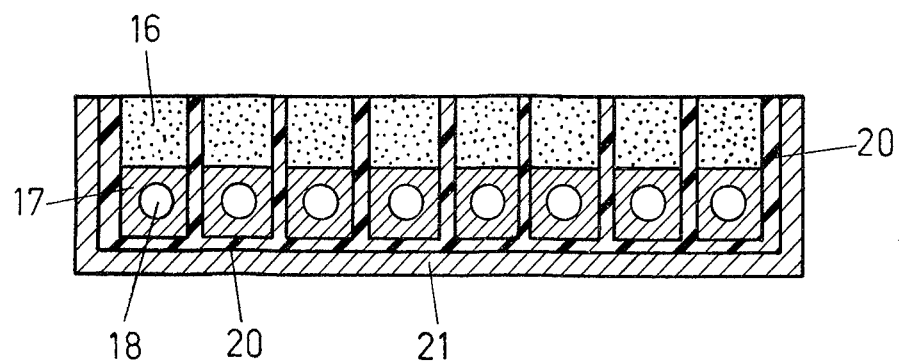

Examples of the invention are illustrated in simplified form in the drawings, in which:

FIG. 1 shows, by way of example, one form of a superconductor assembly of the invention, FIG. 2 shows in its left-hand and right-hand halves two examples of the general arrangement of the invention, consisting of superconductor assemblies, some of which are adjacent to cooling passages, FIG. 3 shows, by way of example, a second form of a superconductor assembly of this invention, and FIG. 4 shows another general arrangement of superconductor assemblies of the invention.

Figure 5:

FIG. 5 shows an embodiment of the invention in which the ends of the superconductor components are joined by diodes.

In FIG. 1, component conductors with embedded filaments are identified by the number 1, a solder by the number 2, a stabilising conductor by the number 3, a cooling channel in the stabilising conductor 3 by the number 4, and a means of insulation by the number 5. In FIG. 2, stabilishing conductors are denoted by the number 6, cooling channels in the stabilishing conductors 6 by the number 7, groups of component conductors by the number 8, cooling tubes by the number 9, cooling channels in the cooling tubes 9 by the number 10, a means of impregnation by the number 11, a solder by the number 11', groups of component conductors in the right-hand half of FIG. 2 by the number 12, stabilising conductors by the number 13, cooling channels in the stabilishing conductors 13 by the number 14, and stabilising conductors without cooling channels by the number 15. In FIGS. 3 and 4 groups of component conductors are identified by the number 16, stabilising conductors by the number 17, cooling channels in the stabilishing conductors 17 by the number 18, a means of insulation (shown only in FIG. 3) by the number 19, a synthetic resin in FIG. 4 by the number 20, and a steel support by the number 21.

The component conductors 1 with embedded filaments shown in FIG. 1 are twisted and cast with solder 2. They are of copper and contain filaments of NbTi. A Pb-Sn alloy has been used as the solder 2. The twisted component conductors 1 are located in a recess in stabilising conductor 3, which is also of copper and incorporates the cooling channel 4. The whole is provided with insulation 5.

The left-hand half of FIG. 2 shows the general arrangement of the conductor assemblies illustrated in FIG. 1. In FIG. 2, the soldered and twisted component conductors comprise the group of component conductors 8, which is embedded in stabilising conductor 6 incorporating cooling channel 7. In the middle of the superconductor depicted in FIG. 2 there are two cooling tubes 9 which form cooling channels 10. The superconductor is provided with an impregnating medium 11 consisting of an epoxy resin. The right-hand half of FIG. 2 shows by way of example another variant of the superconductor of the invention. Three different components have been used: the groups of component conductors 12 with filaments of NbTi embedded in copper, the stabilising conductors 13 incorporating cooling channels 14, and the stabilising conductors 15, which are arranged alternately, the stabilishing conductors 13 and 15 being of copper. The whole is case with solder 11'.

FIG. 3 shows the group of component conductors 16, which is formed by double-twisted component conductors cast in solder. The stabilising part 17 is of copper and contains the cooling channel 18. By way of example, an alternative version of the invention is illustrated in FIG. 4. The conductor assemblies shown in FIG. 3 are in the form of a flat superconductor. They are arranged in a steel support 21 and cast in synthetic resin 20 (epoxy resin).

The subject of the invention is of course not restricted to what is stated above concerning the different variants. Other known superconducting materials can also be used, such as the intermetallic compounds $Nb_3Sn$ and $V_3Ga$. The stabilising conductors 15 without cooling channels as shown in the right-hand half of FIG. 2 can be omitted. The stabilising conductor 13 with cooling channel 14 can also be of a non-stabilising material, such as steel. Instead of the two cooling tubes 9, solid strips can also be used, or they can be omitted. The stabilising material can also be another metal of high electrical conductivity at low temperatures, such as aluminium.

FIG. 5 illustrates the connection of the ends of the component conductors 1, 16 by diodes 22 and associated wires 23 to form a single conductor. In this way, twisting of the superconductor to form a single conductor can be eliminated.

What we claim is:

1. A composite electrical conductor comprising a plurality of superconductor assemblies of component conductors adjacent stabilizing conductors, a plurality of said stabilizing conductors being provided with internal cooling passages, with at least one cooling tube located within the composite electrical conductor between at least a portion of said assemblies.

2. The superconductor of claim 1 wherein stabilizing conductors are disposed adjacent said plurality of superconductor assemblies.

3. The superconductor of claim 2 wherein cooling passages are disposed within at least a portion of said stabilizing conductors adjacent said plurality of superconductor assemblies.

4. The superconductor of claim 1 wherein said superconductor assemblies are insulated from each other.

5. The superconductor of claim 1 wherein layers of a high resistance material are located between the superconductor assemblies.

6. The superconductor of claim 5 wherein said material is solder.

7. The superconductor of claim 5 wherein said material is a foil.

8. The superconductor of claim 1 wherein the component conductors are joined at their ends through a high electrical resistance.

9. The superconductor of claim 8 wherein the ends are joined by diodes.

10. The superconductor of claim 1 wherein said component conductors are stranded into a cable.

11. The superconductor of claim 1 wherein at least one superconductor assembly is rotated through 180°.

12. A superconductor comprising a plurality of stabilizing conductor assemblies adjacent component conductor assemblies, a plurality of said stabilizing conductor assemblies being provided with internal cooling passages, with at least one cooling tube located within the superconductor between at least a portion of said assemblies.

13. The superconductor of claim 12 wherein said superconductor assemblies are insulated from each other.

14. The superconductor of claim 12 wherein layers of a high resistance material are located between the superconductor assemblies.

15. The superconductor of claim 14 wherein said material is solder.

16. The superconductor of claim 14 wherein said material is a foil.

17. The superconductor of claim 12 wherein the component conductors are joined at their ends through a high electrical resistance.

18. The superconductor of claim 17 wherein the ends are joined by diodes.

19. The superconductor of claim 12 wherein at least one superconductor assembly is rotated through 180°.

* * * * *